United States Patent
Shionozaki

(10) Patent No.: US 11,246,008 B2
(45) Date of Patent: Feb. 8, 2022

(54) INFORMATION PROCESSING APPARATUS AND INFORMATION PROCESSING METHOD

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/619,157

(22) PCT Filed: Mar. 1, 2018

(86) PCT No.: PCT/JP2018/007848
§ 371 (c)(1),
(2) Date: Dec. 4, 2019

(87) PCT Pub. No.: WO2018/230051
PCT Pub. Date: Dec. 20, 2018

(65) Prior Publication Data
US 2020/0162846 A1    May 21, 2020

(30) Foreign Application Priority Data

Jun. 13, 2017  (JP) .............................. JP2017-115659

(51) Int. Cl.
| H04W 4/02 | (2018.01) |
| H04W 4/21 | (2018.01) |
| H04W 4/40 | (2018.01) |
| H04W 4/14 | (2009.01) |

(52) U.S. Cl.
CPC ............. *H04W 4/027* (2013.01); *H04W 4/14* (2013.01); *H04W 4/21* (2018.02); *H04W 4/40* (2018.02)

(58) Field of Classification Search
CPC ......... H04W 4/027; H04W 4/21; H04W 4/40; H04W 4/14; G06Q 50/10
USPC ....................................... 455/456.1
See application file for complete search history.

(56) References Cited

U.S. PATENT DOCUMENTS

| 2010/0026526 | A1* | 2/2010 | Yokota ............. G08G 1/096838 |
| | | | 340/996 |
| 2014/0194064 | A1 | 7/2014 | Murakami |
| 2015/0199649 | A1* | 7/2015 | Weinberg ........... G06Q 30/0273 |
| | | | 705/7.19 |
| 2017/0006487 | A1* | 1/2017 | Baldwin ............... H04W 24/08 |

(Continued)

FOREIGN PATENT DOCUMENTS

| JP | 2005-003592 A | 1/2005 |
| JP | 2005-031766 A | 2/2005 |

(Continued)

OTHER PUBLICATIONS

Extended European Search Report of EP Application No. 18818136.6, dated Apr. 23, 2020, 08 pages of EESR.

(Continued)

*Primary Examiner* — Charles N Appiah
*Assistant Examiner* — Frank E Donado
(74) *Attorney, Agent, or Firm* — Chip Law Group

(57) ABSTRACT

An information processing apparatus including a control section calculating, on the basis of a present location of a user, moving time to be spent on immediate movement and generating proposal information based on the movement in accordance with whether or not the calculated moving time satisfies a predetermined condition.

18 Claims, 14 Drawing Sheets

(56) References Cited

U.S. PATENT DOCUMENTS

| | | | |
|---|---|---|---|
| 2017/0039476 A1* | 2/2017 | Eyring | G06Q 10/1093 |
| 2017/0257739 A1* | 9/2017 | Dal Santo | G06F 9/54 |
| 2018/0129645 A1* | 5/2018 | Grant | G06F 40/35 |

FOREIGN PATENT DOCUMENTS

| | | |
|---|---|---|
| JP | 2009-071499 A | 4/2009 |
| JP | 2009-159246 A | 7/2009 |
| JP | 2014-134903 A | 7/2014 |
| JP | 2017-033343 A | 2/2017 |
| JP | 6643828 B2 | 2/2020 |

OTHER PUBLICATIONS

International Search Report and Written Opinion of PCT Application No. PCT/JP2018/007848, dated Jun. 5, 2018, 09 pages of ISRWO.

\* cited by examiner

[FIG. 1]
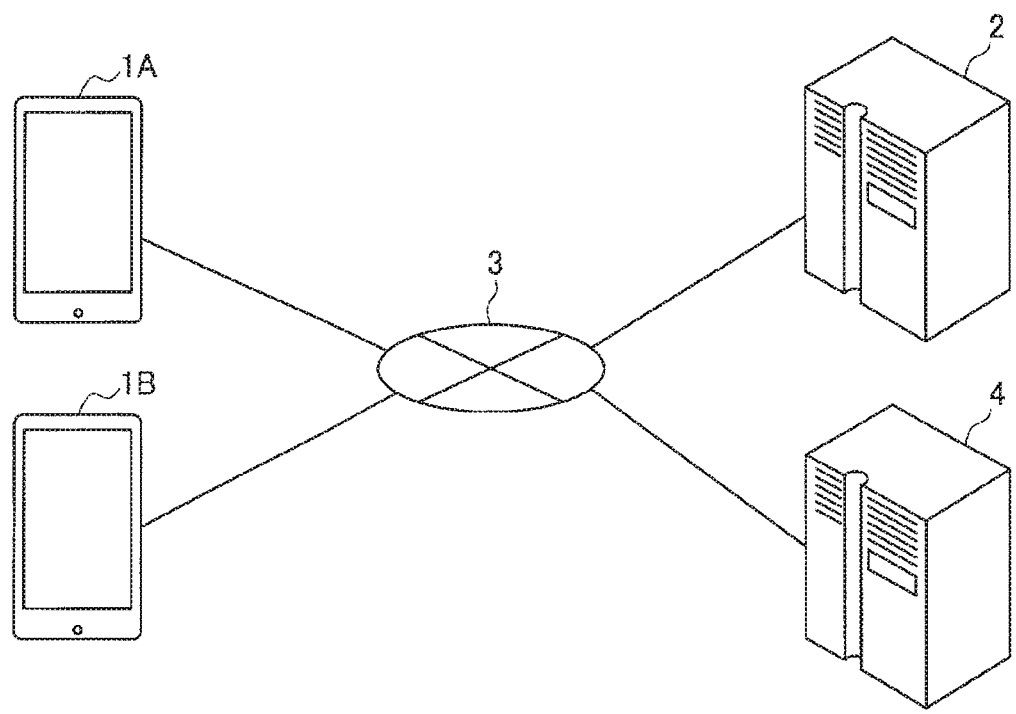

[FIG. 2]
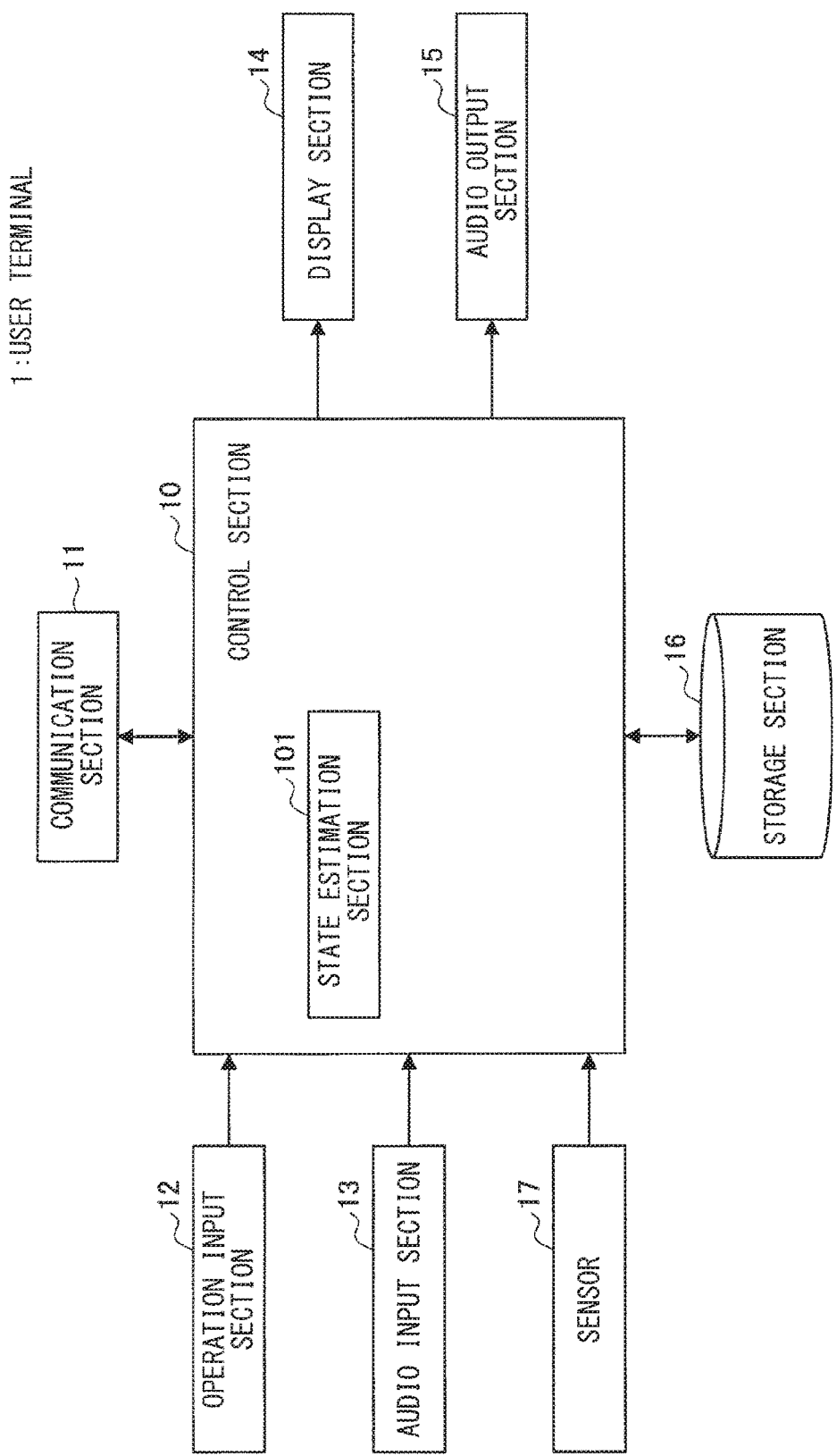

[FIG. 3]
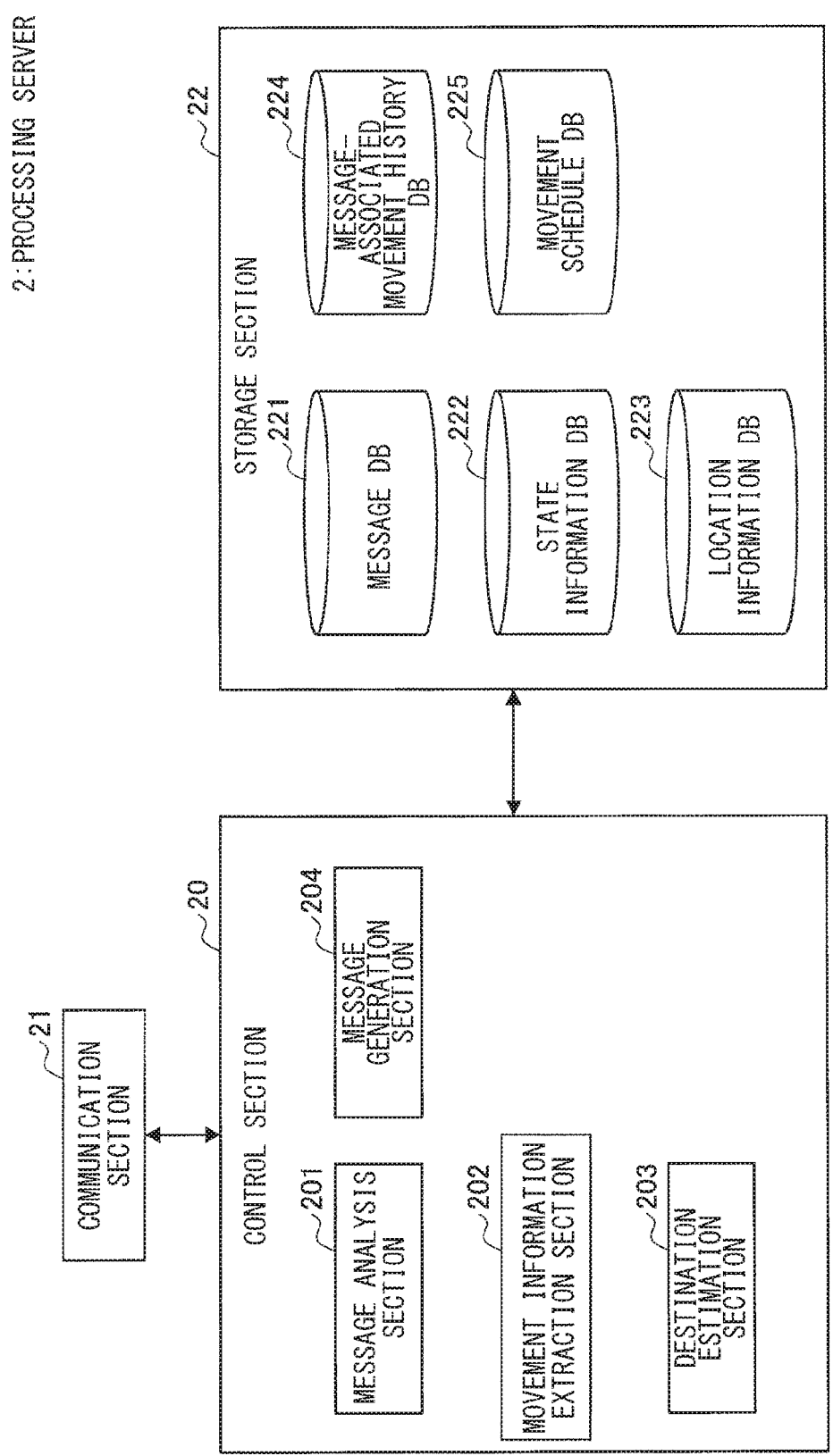

[FIG. 4]
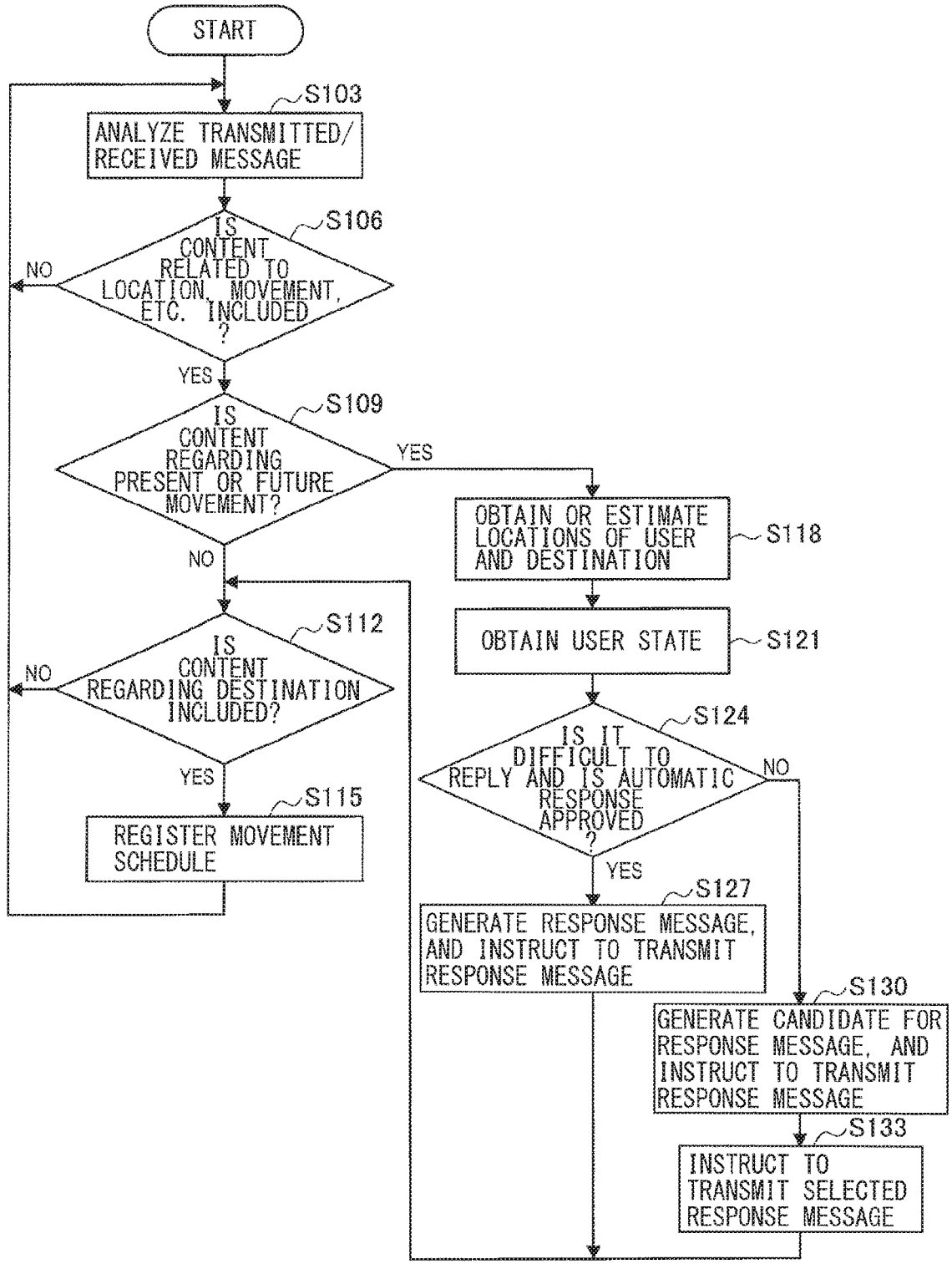

[FIG. 5]
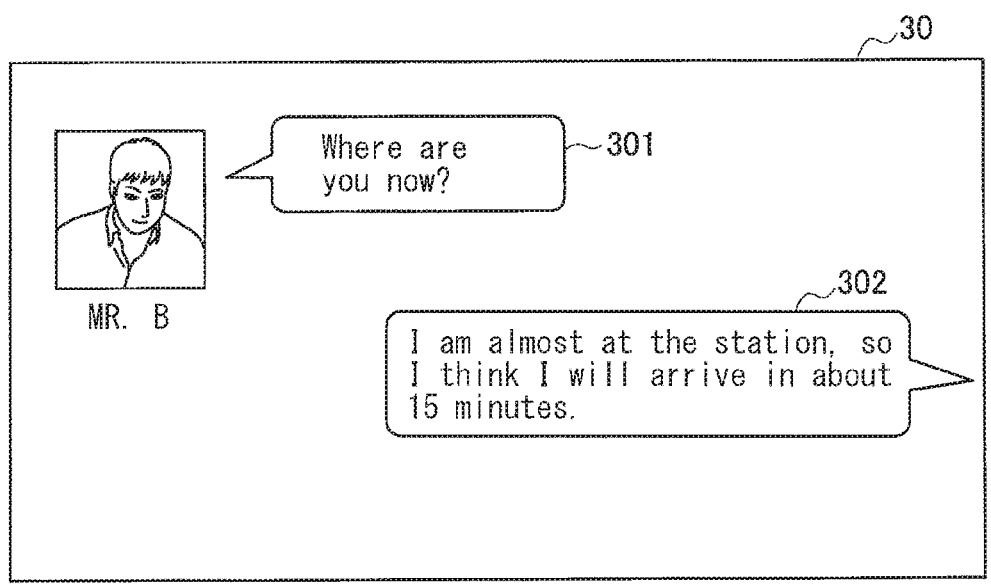

[FIG. 6]
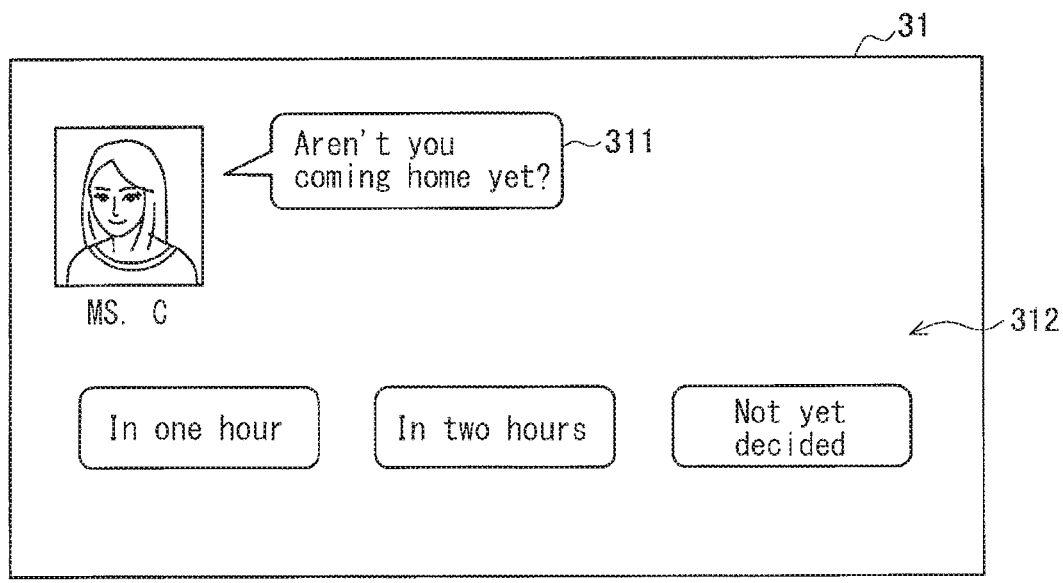
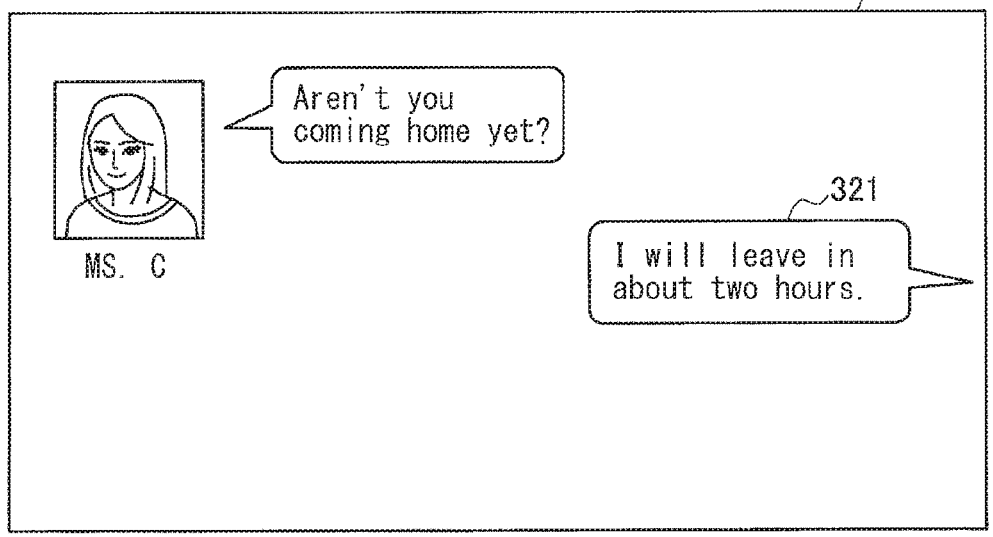

[FIG. 7]
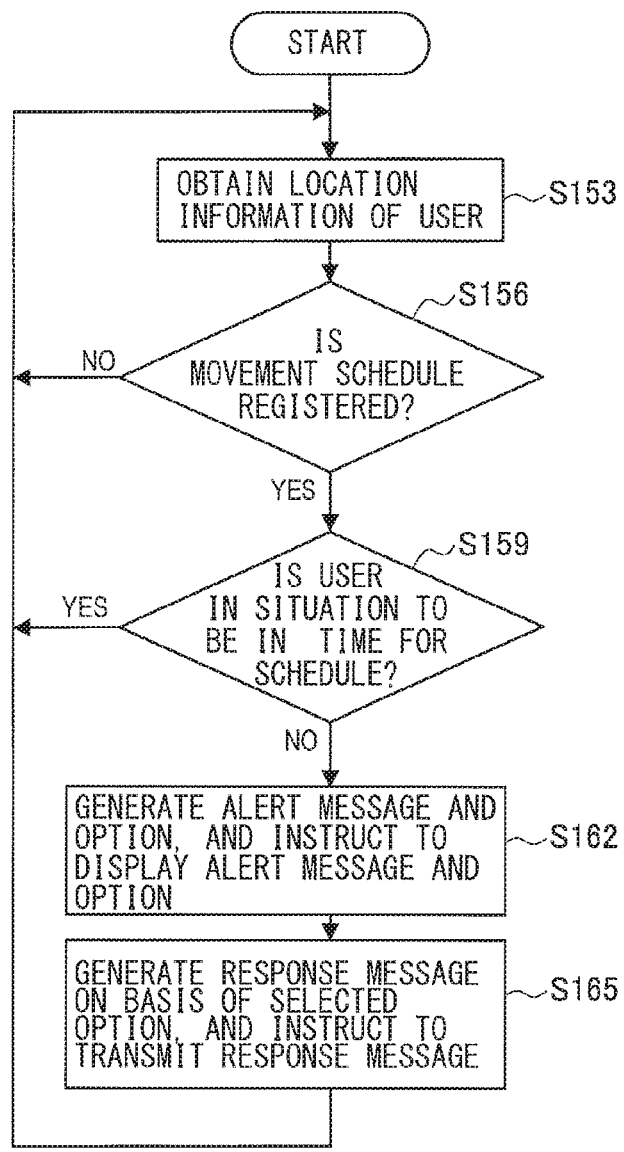

[FIG. 8]
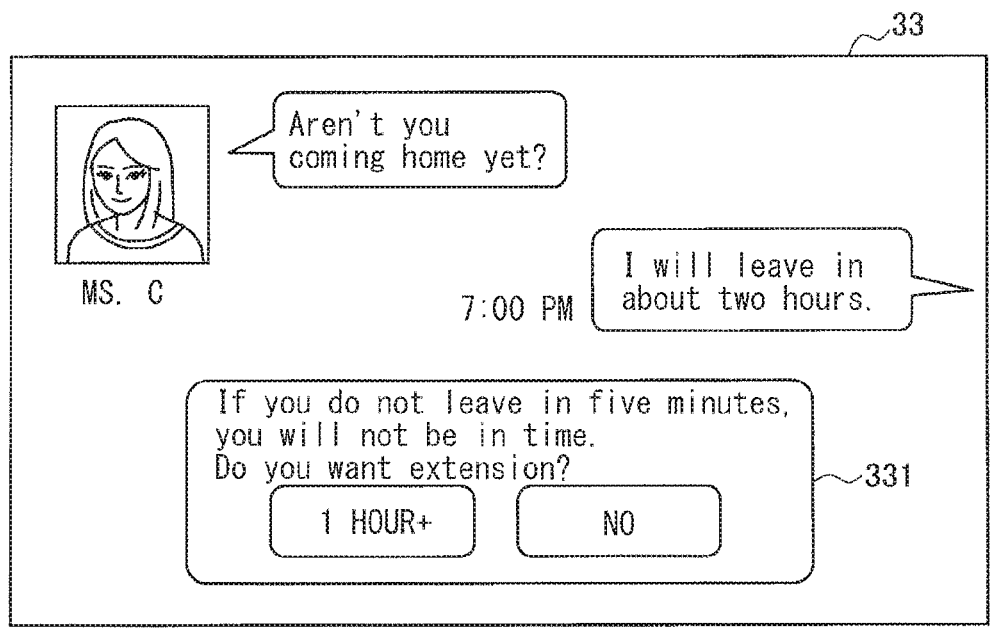
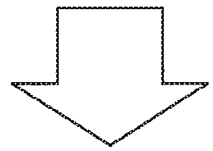
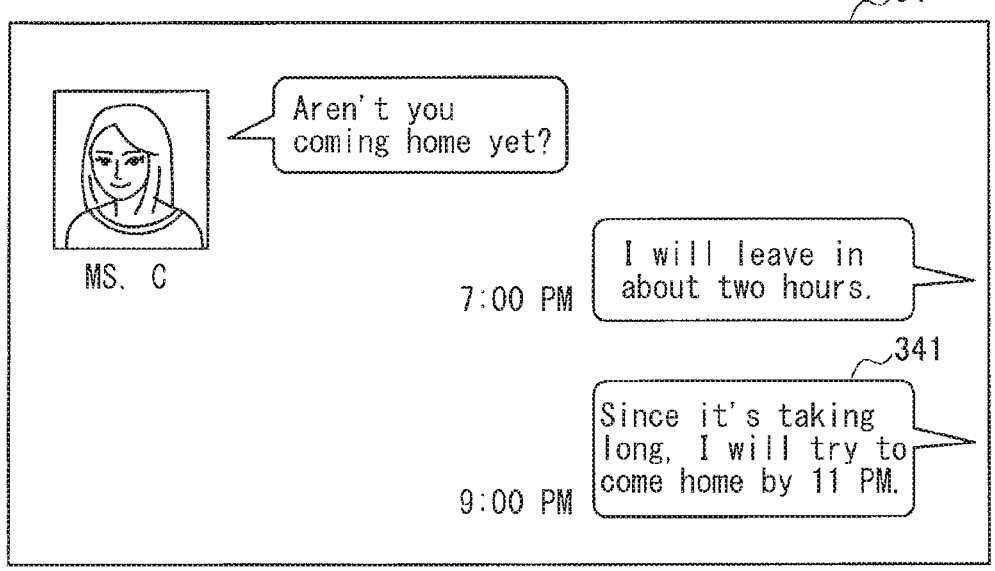

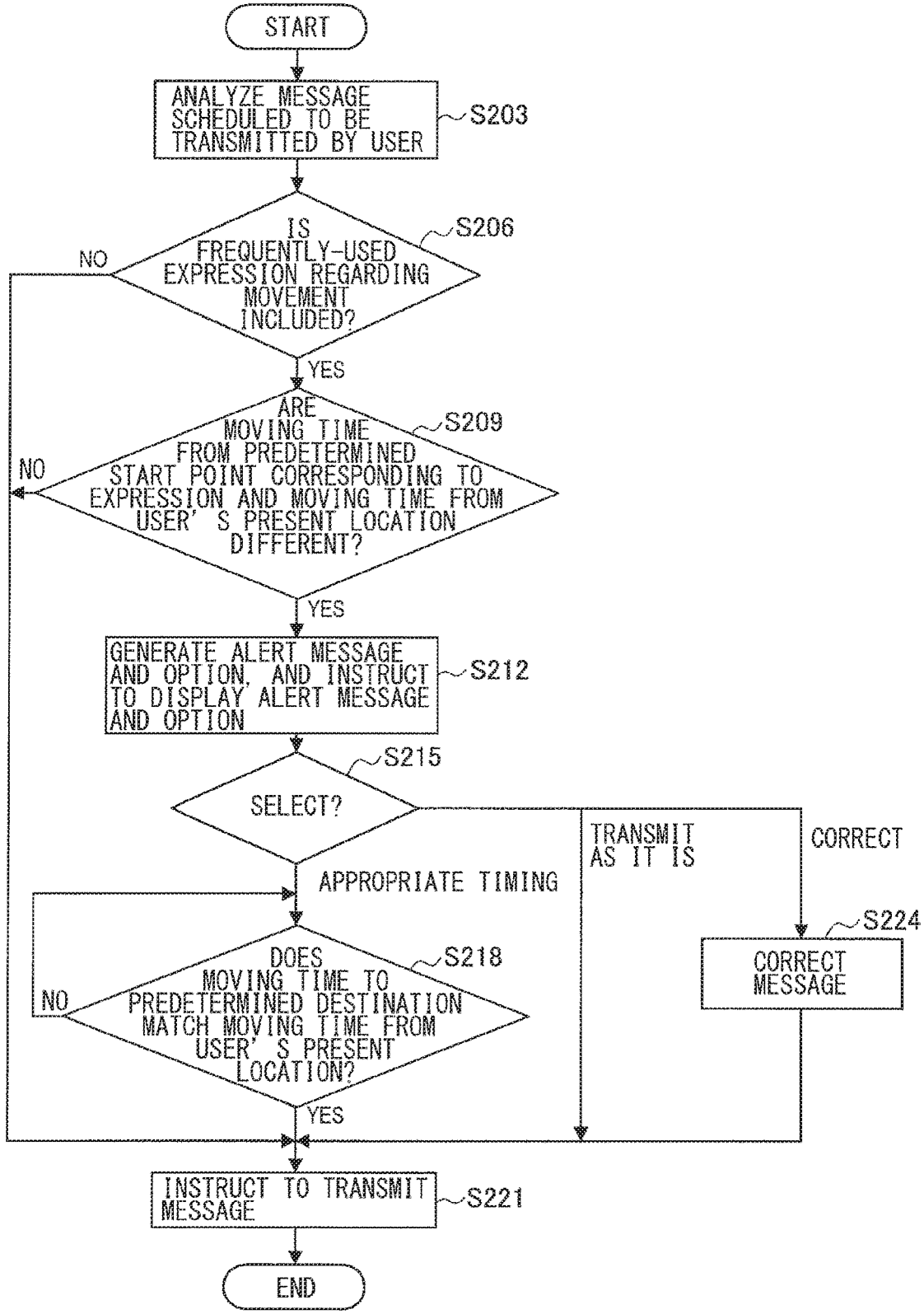
[FIG. 9]

[FIG. 10]
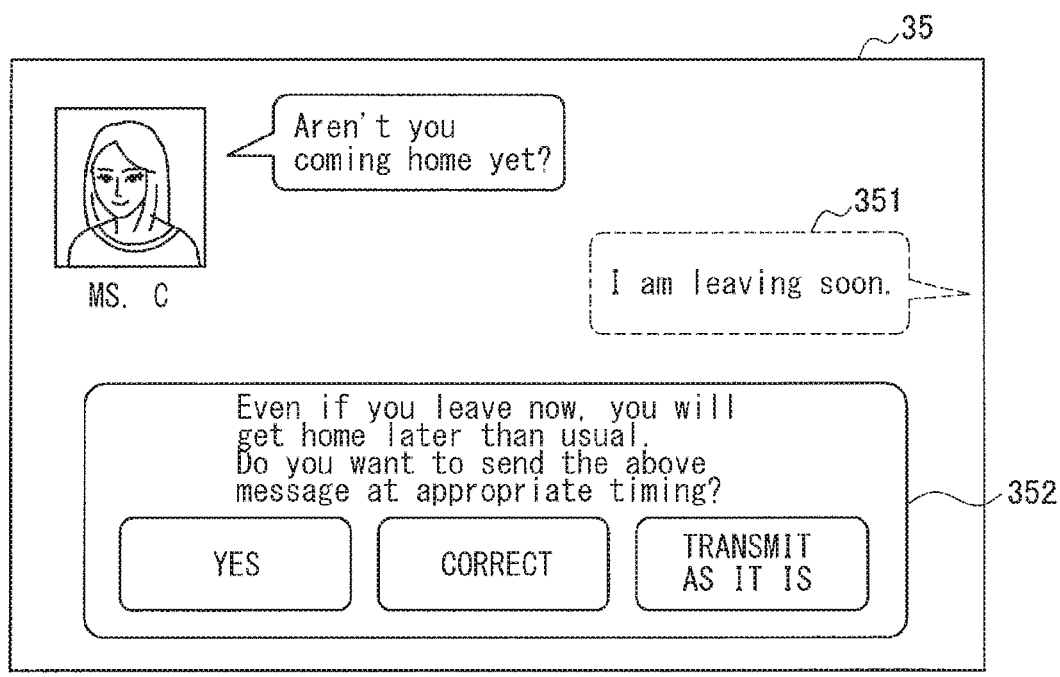

[FIG. 11]
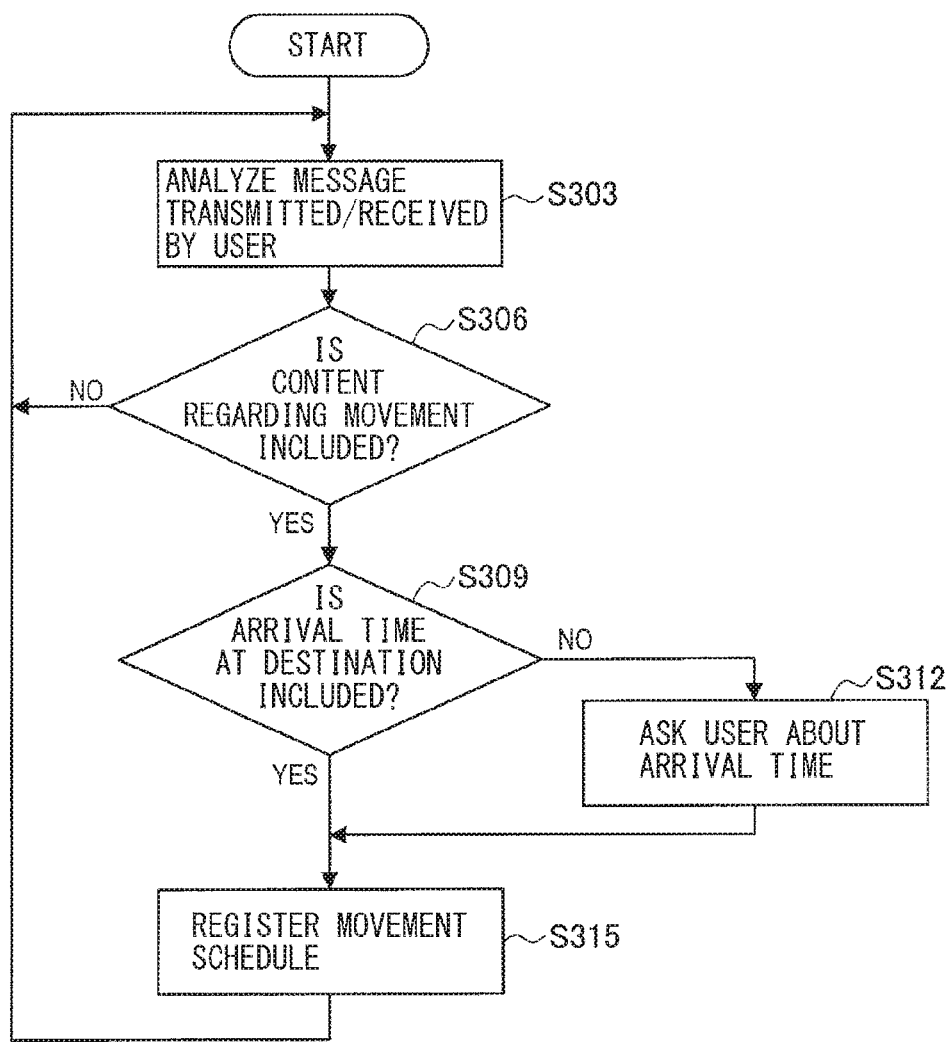

[FIG. 12]
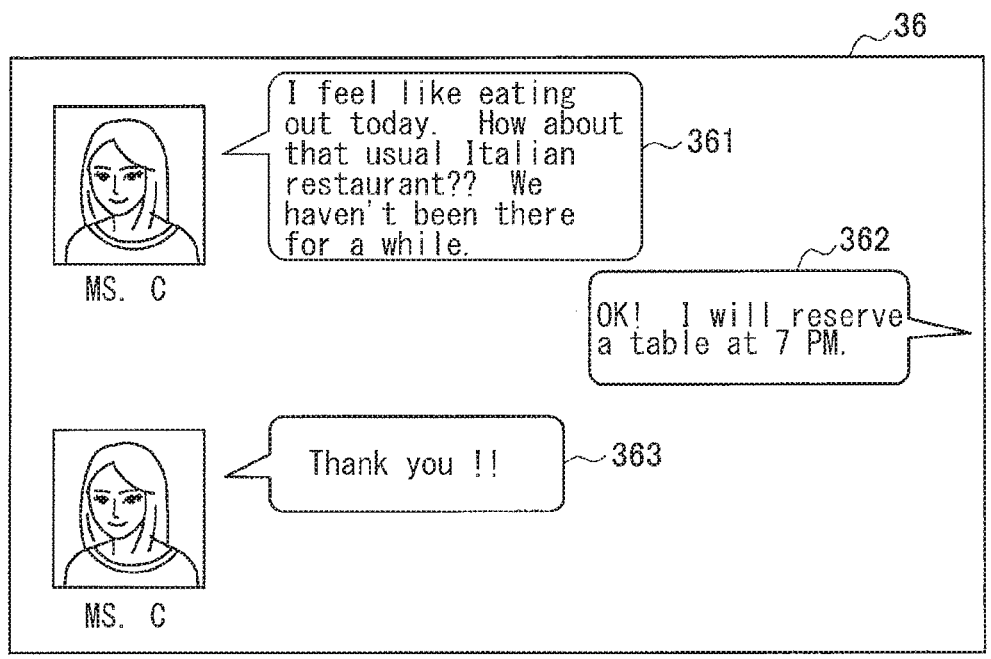

[FIG. 13]
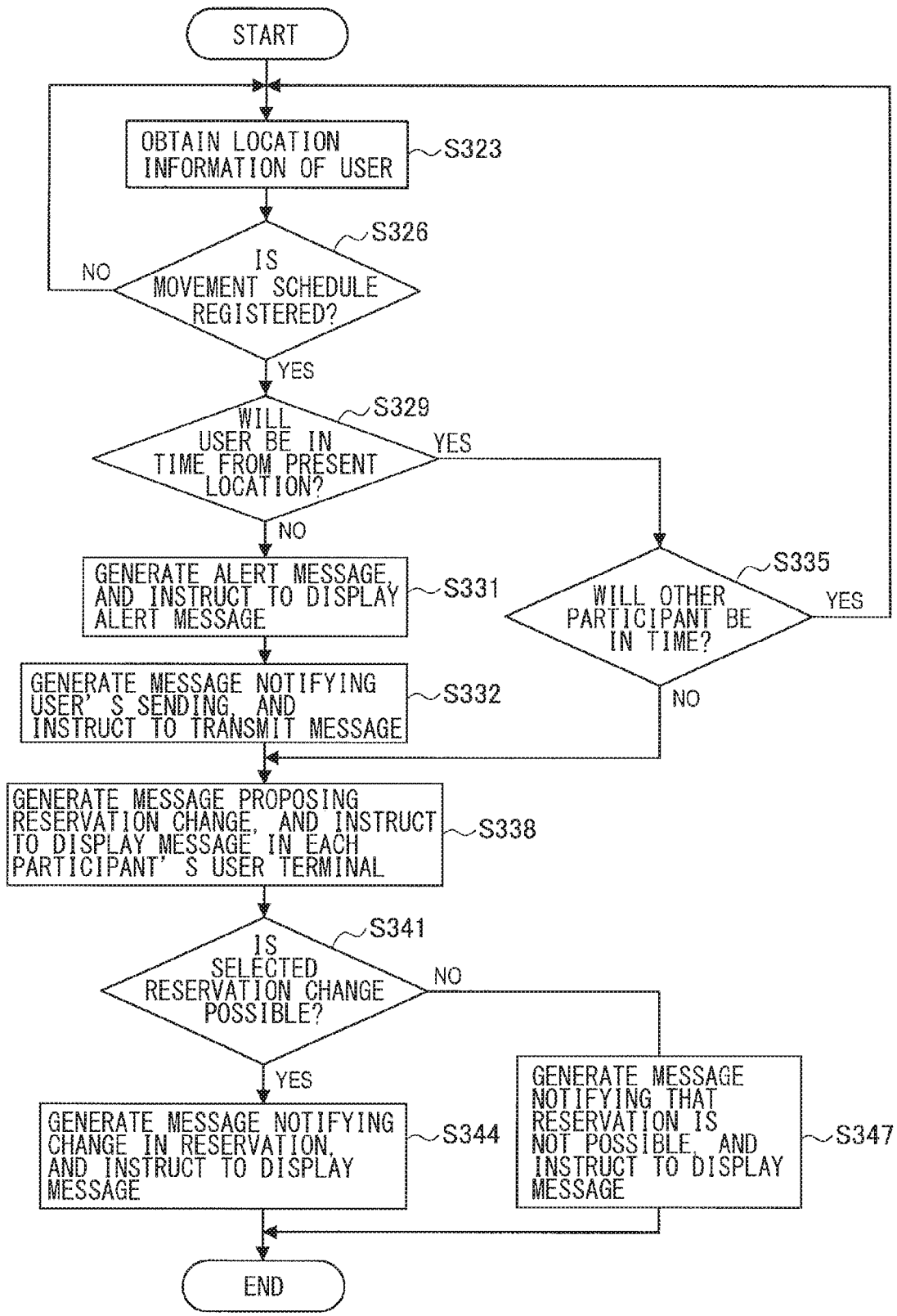

[FIG. 14]
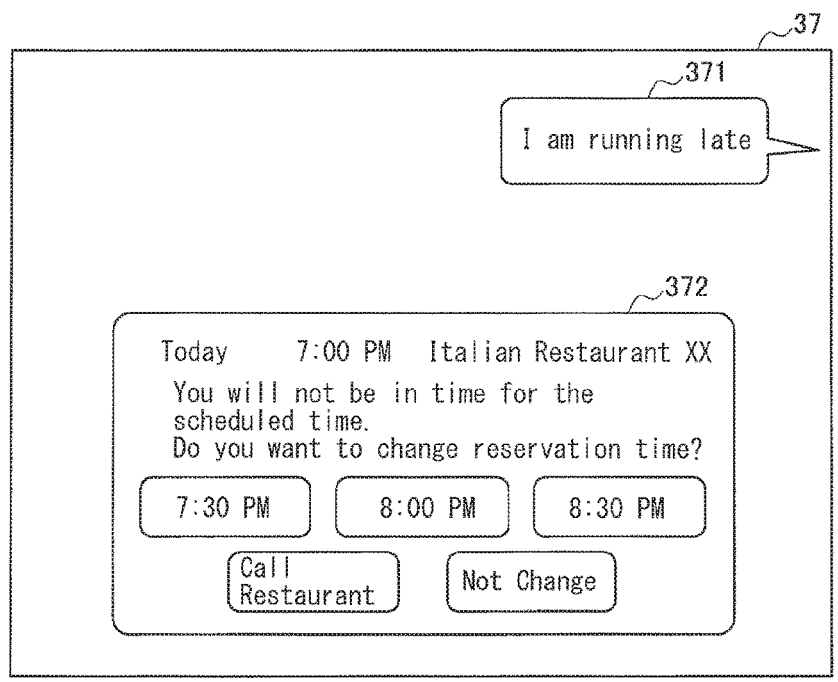

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/007848 filed on Mar. 1, 2018, which claims priority benefit of Japanese Patent Application No. JP 2017-115659 filed in the Japan Patent Office on Jun. 13, 2017. Each of the above-referenced applications is hereby incorporated herein by reference in its entirety.

TECHNICAL FIELD

The present disclosure relates to an information processing apparatus, an information processing method, and a program.

BACKGROUND ART

People have been exchanging messages on a daily basis, using an information processing apparatus such as a smartphone and a PC (personal computer). For example, in a case of meeting someone, it often happens that people themselves determine moving time as to how long it takes to arrive there, and generate and transmit a message regarding movement.

Here, for example, as an information presentation technique that takes into consideration moving time, the following PTL 1 discloses an information distribution system that displays, in consideration of moving time from a present location of a user, an event with start time that the user is able to make it in time for, thus enhancing advertising effectiveness.

CITATION LIST

Patent Literature

PTL 1: Japanese Unexamined Patent Application Publication No. 2009-071499

SUMMARY OF THE INVENTION

Problem to be Solved by the Invention

Here, for example, although it sometimes happens that a user in person determines moving time and notifies a partner of the moving time, or determines start time through back-calculation from scheduled arrival time that is decided as a result of exchange with the partner, there is a case where the user makes a wrong decision or fails to notice departure time even when the departure time is approaching, etc. However, a message regarding movement, thus exchanged on a daily basis like this, has not been fully utilized.

Thus, the present disclosure proposes an information processing apparatus, an information processing method, and a program that make it possible to provide an appropriate proposal to a user on the basis of a message regarding movement.

Means for Solving the Problem

According to the present disclosure, proposed is an information processing apparatus that includes a control section. The control section extracts information regarding movement from a message, calculates, on the basis of a present location of a user, moving time to be spent on immediate movement of the user, and generates proposal information regarding the movement in accordance with whether or not the calculated moving time satisfies a predetermined condition.

According to the present disclosure, proposed is an information processing method, including: causing a processor to extract information regarding movement from a message; causing the processor to calculate, on the basis of a present location of a user, moving time to be spent on immediate movement of the user; and causing the processor to generate proposal information regarding the movement in accordance with whether or not the calculated moving time satisfies a predetermined condition.

According to the present disclosure, provided is a program directed to causing a computer to function as a control section. The control section extracts information regarding movement from a message, calculates, on the basis of a present location of a user, moving time to be spent on immediate movement of the user, and generates proposal information regarding the movement in accordance with whether or not the calculated moving time satisfies a predetermined condition.

Effects of the Invention

As descried above, according to the present disclosure, it is possible to provide an appropriate proposal to a user on the basis of a message regarding movement.

It is to be noted that the effects described above are not necessarily limitative, and any of the effects described herein or any other effect that could be understood from the present description may be provided in addition to or in place of the above effects.

BRIEF DESCRIPTION OF DRAWINGS

FIG. 1 is a diagram that describes an overview of an information processing system according to an embodiment of the present disclosure.

FIG. 2 is a block diagram that illustrates an example of a configuration of a user terminal according to the present embodiment.

FIG. 3 is a block diagram that illustrates an example of a configuration of a processing server according to the present embodiment.

FIG. 4 is a flowchart that illustrates operation processing of an automatic response according to a first working example.

FIG. 5 is a diagram that illustrates an example of an automatic response message according to the first working example.

FIG. 6 is a diagram that illustrates an example of a candidate for an automatic response message according to the first working example.

FIG. 7 is a flowchart that illustrates operation processing based on moving schedule information according to a second working example.

FIG. 8 is a diagram that illustrates an example of an alert and an extension message according to the second working example.

FIG. 9 is a flowchart that illustrates operation processing of an alert and a correction proposal according to a third working example.

FIG. 10 is a diagram that illustrates an example of a display screen for an alert message and an option according to the third working example.

FIG. 11 is a flowchart that illustrates registration processing of a movement schedule based on a message according to a fourth working example.

FIG. 12 is a diagram that illustrates an example of a message exchange according to the fourth working example.

FIG. 13 is a flowchart that illustrates notification processing of a movement schedule according to the fourth working example.

FIG. 14 is a diagram that illustrates an example of a display of a proposal for a schedule change according to the fourth working example.

MODES FOR CARRYING OUT THE INVENTION

In the following, some preferred embodiments of the present disclosure are described in detail with reference to the attached drawings. It is to be noted that, in the present description and drawings, the same reference numerals are assigned to components having substantially the same functional configurations, thereby omitting duplicate descriptions.

In addition, the description is given in the following order.
1. Overview of Information Processing System According to Embodiment of Present Disclosure
2. Configuration
   2-1. Configuration of User Terminal 1
   2-2. Configuration of Processing Server 2
3. Working Examples
   3-1. First Working example
   3-2. Second Working Example
   3-3. Third Working Example
   3-4. Fourth Working Example
4. Summary

1. OVERVIEW OF INFORMATION PROCESSING SYSTEM ACCORDING TO EMBODIMENT OF PRESENT DISCLOSURE

FIG. 1 is a diagram that describes an overview of an information processing system according to an embodiment of the present disclosure. As illustrated in FIG. 1, the information processing system according to the present embodiment includes a user terminal 1 (1A and 1B) of each user, a processing server 2 that performs analysis and the like on a message exchanged between users, and a message server 4 that controls message exchange between users.

The information processing system according to the present embodiment, when each user is performing message exchange using the user terminal 1 with a message application, an e-mail system, etc., makes it possible to extract information regarding movement (such as movement schedule and movement state, hereinafter, also referred to as movement information), and provide an appropriate proposal to each user on the basis of the extracted movement information.

More specifically, the information processing system according to the present embodiment makes it possible to register a destination, scheduled arrival time, etc. as movement schedule information on the basis of the extracted movement information, calculate moving time to the destination on the basis of location information of the user, and determine whether or not it is possible to be (arrive) in time for the scheduled arrival time. When it seems difficult to be in time, it is possible for the information processing system according to the present embodiment to provide an alert, and automatically generate a message notifying a partner user of lateness (as an agent or a bot) and transmit the message.

In addition, when asked by a partner about scheduled arrival time (for example, "How much more time will it take you to arrive?"), in a case where a user is in a hurry and unable to reply, the present information processing system also makes it possible to automatically calculate moving time to a destination (for example, a place where the partner is present), and automatically reply on behalf of the user as an agent or a bot.

It is to be noted that location information of a user and a partner is not limited to a result of positioning by a positioning section such as a GPS included in a user terminal, but it is also possible to perform estimation through mining from a message exchanged between the user and the partner.

In addition, the information processing system according to the present embodiment makes it possible to store a movement history in association with a message (particularly, a transmitted message) of a user. When the user transmits a message regarding movement that is usually transmitted by the user (for example, "I'm going home now"), the information processing system according to the present embodiment makes it possible to calculate moving time to a destination on the basis of the message and provide an alert, a proposal, etc. For example, in a case where moving time from a usual start point (for example, an office) to a destination (for example, home) in the movement history associated with the message is different from moving time from a present location of the user to the destination, an error occurs in arrival time. Therefore, the present information processing system makes it possible to provide an alert to the user, prompt the user to correct the message, and perform control to transmit the corrected message at appropriate timing.

The information processing system according to the embodiment of the present disclosure has been described above. A specific configuration of each device included in the information processing system according to the present embodiment is subsequently described with reference to the drawings.

2. CONFIGURATION

2-1. Configuration of User Terminal 1

FIG. 2 is a block diagram that illustrates an example of a configuration of the user terminal 1 according to the present embodiment. As illustrated in FIG. 2, the user terminal 1 includes a control section 10, a communication section 11, an operation input section 12, an audio input section 13, a display section 14, an audio output section 15, a storage section 16, and a sensor 17.

The control section 10 functions as an arithmetic processing device and a controller, and controls an overall operation in the user terminal 1 in accordance with various types of programs. For example, the control section 10 is implemented by an electronic circuit such as a CPU (Central Processing Unit) or a microprocessor. In addition, the control section 10 may include a ROM (Read Only Memory) that holds a program, an arithmetic parameter, and so on that are used, and a RAM (Random Access Memory) that temporality holds a parameter and so on that vary appropriately.

For example, the control section 10 according to the present embodiment performs control to display, in the display section 14, a text message inputted from the operation input section 12, and to transmit the inputted text message to the processing server 2, the message server 4, etc. In addition, the control section 10 also makes it possible to convert to text, an audio message inputted from the audio input section 13, and display the converted text message in the display section 14. In addition, the control section 10 performs control, on the basis of data received from the message server 4, to display a message screen in the display section 14, and to output an audio message from the audio output section 15.

In addition, the control section 10 according to the present embodiment also functions as a state estimation section 101 that estimates a user state. Specifically, the state estimation section 101 analyzes sensor information detected by the sensor 17 (for example, acceleration sensor information, gyroscope sensor information, biosensor information, and location information) and audio information collected by the audio input section 13 (such as a spoken voice or an environmental sound), to thereby estimate a user state. For example, the state estimation section 101 makes it possible to recognize, through behavior recognition processing, whether a user is in a walking state, in a running state, in a state of riding on transportation, or the like, and further makes it possible to estimate whether or not the user is in a hurry. Besides behavior recognition, the state estimation section 101 also makes it possible to estimate a state with reference to schedule information, message exchange, and so on regarding the user. It is possible to perform state estimation by the state estimation section 101 periodically or continuously. In addition, a result of the estimation is transmitted to the processing server 2.

(Communication Section 11)

The communication section 11 is coupled, by wire or wirelessly, to an external device (for example, a peripheral device, a router, a base station, or a server), to perform transmitting and receiving of data. Specifically, for example, the communication section 11 according to the present embodiment is coupled to a network 3 to perform transmitting and receiving of data with the processing server 2, the message server 4, etc. In addition, the communication section 11 performs communication coupling with an external device through wired/wireless LAN (Local Area Network), or Wi-Fi (registered trademark), mobile communication network (LTE (Long Term Evolution), 3G (third-generation mobile communication method)), or the like.

(Operation Input Section 12)

The operation input section 12 receives an instruction of operation from a user, and outputs content of the operation to the control section 10. The operation input section 12 may be a touch sensor, a pressure sensor, or a proximity sensor. Alternatively, the operation input section 12 may be a physical structure such as a button, a switch, or a lever.

(Audio Input Section 13)

The audio input section 13 is implemented by a microphone, a microphone amplifier that performs amplification processing on an audio signal obtained by the microphone, and an A/D converter that performs digital conversion to an audio signal. The audio input section 13 outputs the audio signal to the control section 10.

(Display Section 14)

The display section 14 is a display device that outputs a message screen, a menu screen, and so on. For example, this display section 14 may be a display device such as a liquid crystal display (LCD: Liquid Crystal Display) or an organic EL (Electro Luminescence) display.

(Audio Output Section 15)

The audio output section 15 includes a speaker that reproduces an audio signal and an amplifying circuit for the speaker.

(Storage Section 16)

The storage section 16 is implemented by a ROM (Read Only Memory) that holds a program, an arithmetic parameter, and so on used in processing by the control section 10 and a RAM (Random Access Memory) that temporarily holds a parameter and so on that vary appropriately.

(Sensor 17)

The sensor 17 includes various types of sensors that detect various pieces of information. For example, the sensor 17 is implemented by a positioning section that performs positioning of a present location, a motion sensor that detects movement of a user (such as an acceleration sensor, a gyroscope sensor, or a geomagnetic sensor), a biosensor that detects biological information of a user (such as a body temperature sensor, a vein sensor, a pulse sensor, a heart rate sensor, a perspiration sensor, or a brain wave sensor), a camera (in other words, an imaging sensor), or an environmental sensor that detects a surrounding environment (such as a temperature sensor, a humidity sensor, or an illuminance sensor). It is to be noted that the positioning section may be implemented by, for example, a GPS (Global Positioning System) positioning section, and receive a radio wave from a GPS satellite, to detect a location at which the user terminal 1 is present (in other words, perform outdoor positioning). Alternatively, for example, the positioning section may detect a location by, other than the GPS, transmission and reception through Wi-Fi (registered trademark), Bluetooth (registered trademark), a cellular phone, a PHS, a smartphone, and so on or through short range communication, and so on (in other words, indoor positioning).

A specific configuration of the user terminal 1 according to the present embodiment has been described above. It is to be noted that the configuration of the user terminal 1 is not limited to the example illustrated in FIG. 2. For example, at least a portion of the configuration of the user terminal 1 illustrated in FIG. 2 may be provided in an external device (such as a peripheral device, a router, or a server). For example, state estimation processing performed by the state estimation section 101 may be performed on side of the peripheral device or the server.

In addition, the user terminal 1 is not limited to a smartphone illustrated in FIG. 1, and may be a tablet terminal, a cellular phone terminal, a PC (personal computer), a wearable device (such as smart glasses, a smart band, a smart watch, or a smart neckband), a music player, a game device, or the like.

2-2. Configuration of Processing Server 2

FIG. 3 is a block diagram that illustrates an example of a configuration of the processing server 2 according to the present embodiment. As illustrated in FIG. 3, the processing server 2 includes a control section 20, a communication section 21, and a storage section 22.

(Control Section 20)

The control section 20 functions as an arithmetic processing device and a controller, and controls an overall operation in the processing server 2 in accordance with various types of programs. For example, the control section 20 is implemented by an electronic circuit such as a CPU (Central Processing Unit) or a microprocessor. In addition, the control section 20 may include a ROM (Read Only Memory)

that holds a program, an arithmetic parameter, and so on that are to be used, and a RAM (Random Access Memory) that temporarily holds a parameter and so on that vary appropriately.

In addition, the control section 20 according to the present embodiment also functions as a message analysis section 201, a movement information extraction section 202, a destination estimation section 203, and a message generation section 204.

The message analysis section 201 analyzes a message that is exchanged by a specific user and accumulated in a message DB (database) 221 in the storage section 22. Specifically, the message analysis section 201 performs, on a text message, natural language processing (morphological analysis, syntax analysis, semantic analysis, and context analysis), keyword extraction, and so on.

The movement information extraction section 202 extracts information regarding movement on the basis of a result of the analysis by the message analysis section 201. For example, the information regarding movement includes a movement situation (including a movement means, a present location, etc.), a movement schedule (including a destination, scheduled arrival time, departure time, a date, etc.), and a keyword that serves as a trigger to start movement, such as "I will head there now", "I will be back in an hour", "I'm going home now", "There are two more stations left", "Let's meet at XX at X o'clock tomorrow", "I made a reservation at X o'clock, so let's meet at the restaurant". The movement information extraction section 202 registers the extracted movement information in the movement schedule DB 225.

In addition, the movement information extraction section 202 accumulates, in association with each other, a message expression regarding movement that is frequently used by a user (for example, "I'm going home now") and a movement history (including a movement start position (start point), a destination, and a movement means) of the user at a time when the expression is used, in a message-associated movement history DB 224. This makes it possible to grasp a tendency of a movement history associated with a message regarding user movement (what type of movement the user is performing when transmitting what type of message).

The destination estimation section 203 estimates a destination of movement of a user on the basis of a result of analysis by the message analysis section 201 and movement information extracted by the movement information extraction section 202. For example, in a case where a message is received such as "Where are you now? How much later will you arrive?" from a partner user, which asks about arrival time at a place where the partner user is present, the destination estimation section 203 estimates a present location of the partner user to be the destination of the movement of the user. At this time, location information of the partner is obtained from the user terminal 1 of the partner, but in a case of failing to obtain the location information, it is possible for the destination estimation section 203 to estimate the location (destination) on the basis of an attribute of the partner, a history of message exchange, schedule information of the user, or the like. For example, in a case where the partner's attribute is "office", the destination estimation section 203 estimates a pre-registered location of the office to be the destination. In addition, in a case where the user's schedule information includes "drinking party", the destination estimation section 203 estimates the registered location for the drinking party to be the destination.

The message generation section 204 generates an alert message, a proposal for message correction, and so on to the user, while generating a message to be automatically transmitted (by an agent or a bot on behalf of the user), a candidate for the message to be automatically transmitted, and so on. More specifically, for example, with reference to movement schedule information registered in the movement schedule DB 225, the message generation section 204 calculates moving time to the registered destination from the present location of the user, and determines whether or not the user will be in time for scheduled arrival time (with time to spare). In a case where it is determined that the user will not be in time, the message generation section 204 automatically generates an alert message, a message notifying lateness, etc. The message notifying lateness may include, on the basis of the calculated moving time, information regarding how much more time it will take to arrive or when the user will arrive.

In addition, the message generation section 204 makes it possible to compare moving time from the user's present location assumed by the partner user to the predetermined destination and moving time from a place where the user is actually present to the predetermined destination. The message generation section 204 makes it possible to, for example, present an alert message or makes a proposal for message correction or a proposal for controlling transmission timing. For example, in a case where the user is supposed to be working overtime in the office but is actually participating in a drinking party at a different place, if the user transmits a message "I'm leaving now" without changing the expression, which is habitually transmitted when leaving the office, the partner estimates arrival time in consideration of moving time to be spent on going home from the office. However, since the user is actually moving from a different place, an error occurs in arrival time. In this case, the message generation section 204 generates and presents, to the user, an alert message such as "Even if you leave now, you will get home later than usual" or "It will take more moving time than going home from the office". In addition, along with the alert message, the message generation section 204 generates and presents a proposal message such as "Do you want to correct the message?" or "Do you want to send the message at appropriate timing?"

It is to be noted that it is possible to estimate the present location assumed by the partner user and a predetermined determination on the basis of message exchange and a message intended to be transmitted by the user, or schedule information shared with the partner user, and the like. Specifically, for example, it is possible for the message generation section 204 to determine, with reference to the message-associated movement history DB 224, a start point (for example, "office") and a destination (for example, "home") in a case where the message intended to be transmitted by the user includes an expression frequently used by the user, on the basis of the movement history associated with the message including the expression.

The generated alert message, proposal message, and candidate for the message to be automatically transmitted are each transmitted from the communication section 21 to the user terminal 1 and presented to the user. In addition, the message to be automatically transmitted may be transmitted to the user terminal 1, and then transmitted from the user terminal 1(1A) to the user terminal 1(1B) of the partner user via the message server 4, or may be transmitted from the processing server 2 to the message server 4, and then transmitted to the user terminal 1(1B) from the message server 4.

(Communication Section 21)

The communication section 21 is coupled to the network 3 by wire or wirelessly and performs, via the network 3, transmitting and receiving of data with an external device such as each user terminal 1 or another server. For example, the communication section 21 performs communication coupling with the network 3 by wired or wireless LAN (Local Area Network), Wi-Fi (Wireless Fidelity, registered trademark), or the like.

(Storage Section 22)

The storage section 22 is implemented by a ROM that holds a program, an arithmetic parameter, and so on that are used in processing by the control section 20, and a RAM that temporality holds a parameter and so on that vary appropriately. For example, the storage section 22 according to the present embodiment holds the message DB 221, a state information DB 222, the location information DB 223, the message-associated movement history DB 224, and the movement schedule DB 225.

In the message DB 221, messages exchanged between a plurality of users and user information are accumulated. It is possible to obtain a message exchanged between users from the message server 4.

In the state information DB 222, state information of each user is accumulated. For example, the state information is estimated by the state estimation section 101 in the user terminal 1 and transmitted from the user terminal 1 to the processing server 2.

In the location information DB 223, location information of each user is accumulated. For example, the location information is measured by the user terminal 1 and transmitted from the user terminal 1 to the processing server 2.

In the message-associated movement history DB 224, a message (character string) and movement information of the user at a time when transmitting the message (for example, information regarding movement before and after transmitting the message (including a start point, a destination, a date and time, a movement means, etc.)) are accumulated in association with each other.

In the movement schedule DB 225, information regarding a movement schedule (including a date and time, a destination, a movement means, scheduled arrival time, etc.) is accumulated for each user.

A specific configuration of the processing server 2 according to the present embodiment has been described above. It is to be noted that the configuration of the processing server 2 illustrated in FIG. 3 is an example, and the present embodiment is not limited to this. For example, at least a portion of the configuration of the processing server 2 may be included in an external device, and at least a portion of each function of the control section 20 may be implemented by the user terminal 1 or an information processing terminal (for example, a so-called edge server) having a comparatively short communication distance from the user terminal 1. For example, a configuration may be provided in which at least one of message analysis, extraction of movement information, estimation of the destination, and message generation is performed by the user terminal 1 or an information processing terminal having a closer communication distance to the user terminal 1 than the processing server 2. In this manner, appropriate distribution of configurations in the processing server 2 makes it possible to enhance a real-time property, reduce a processing load, and furthermore, ensure security. In addition, all of the configurations and the DBs in the control section 20 illustrated in FIG. 3 may be included in the user terminal 1, to cause the information processing system according to the present embodiment to be executed with an application in the user terminal 1.

3. WORKING EXAMPLES

Subsequently, an information processing system according to the present embodiment is specifically described with reference to some working examples.

3-1. First Working Example

In a first working example, in a case where a user receives a message regarding movement but is in a hurry and does not have enough time to respond to the message, etc., it is possible to perform automatic response on behalf of the user in accordance with a state of the user. In the following, a specific description is given with reference to FIGS. 4 to 6.

FIG. 4 is a flowchart that illustrates operation processing of an automatic response according to the first working example. As illustrated in FIG. 4, first, the message analysis section 201 in the processing server 2 performs analysis of a message transmitted and received between a specific user and a partner user (Step S103). The message transmitted and received between the specific user and the partner user through the message server 4 may be accumulated (in real time) in the message DB 221 in the processing server 2, and the message analysis section 201 may analyze the message accumulated in the message DB 221. It is possible to perform message analysis regularly or continuously, or at a time when transmitting and receiving of a message is performed.

Next, the movement information extraction section 202 determines, on the basis of a result of the analysis, whether or not content related to location, movement, etc. is included in the transmitted and received message (Step S106). For example, the content related to location, movement, etc. is assumed to include content regarding the user's present location, a place that the user is heading to (destination), or the partner's location, content implying a start of movement of the user (such as "I will head there now", "I'm leaving now", "I will wait for you at XX at X o'clock", or "I will leave in an hour"), and content implying that the user is in the middle of moving (a message from the partner user, such as "Where are you now?" or "How much longer?" and so on).

Thereafter, in a case where content related to location, movement, etc. is included in the transmitted or received message (Step S106/Yes), the movement information extraction section 202 determines whether or not the content is regarding present or future movement (Step S109).

Next, in a case where the content is not regarding the present or future movement (Step S109/No), the movement information extraction section 202 determines whether or not content regarding a destination is included (Step S112).

Thereafter, in a case where the content regarding a destination is included (Step S112/Yes), the movement information extraction section 202 registers, in the movement schedule DB 225, the extracted information (a destination, scheduled arrival time, and so on) as a movement schedule (Step S115).

In contrast, in a case where the content is regarding the present or future movement (Step S109/Yes), the control section 20 obtains or estimates the present location and the destination of the user (Step S118). Specifically, for example, the control section 20 obtains the location of the user by receiving, from the user terminal 1, location information measured by the positioning section that is included in the user terminal 1, and causes the destination estimation section 203 to estimate the destination on the basis of message content. For example, in estimating the destination, the present location of the partner user may be estimated to be the destination on the basis of the message content, or a place (office, home, and so on) linked to affiliation of the partner user (company, family, and so on) may be estimated to be the destination.

Next, the control section 20 obtains a present state of the user from the state information DB 222 (Step S121). In the state information DB 222, information regarding the user state (specifically, whether or not the user is busy, and so on) that is continuously transmitted from the user terminal 1 is accumulated.

Therefore, the control section 20 determines whether or not it is difficult for the user to reply to the message and whether or not automatic response is approved by the user (Step S124). It is possible to determine whether or not it is difficult to reply, on the basis of the user state accumulated in the state information DB 222. For example, in a case where the user is scurrying, where the user is driving a car or riding a bicycle, or where the user is changing trains, the control section 20 determines that the user is busy and therefore it is difficult for the user to generate a response message. In addition, in a case of being able to obtain the schedule information of the user, in a case where the location of the user is distant from a place where an upcoming meeting is scheduled to take place and the user is running while moving, the control section 20 determines that the user is in a hurry and therefore it is difficult for the user to reply (generate a response message). An algorithm for such determination is not particularly limitative, but a rule may be preset, or a determination model may be constructed by machine learning.

In addition, it is possible to have the user preset an approval for automatic response.

Subsequently, in a case where it is difficult for the user to reply to the message and automatic response is approved by the user (Step S124/Yes), the message generation section 204 generates a response message, and provides an instruction to transmit the generated message to the partner user (Step S127). More specifically, for example, in a case where the partner user asks about arrival time, the message generation section 204 calculates, on the basis of the present location and the movement means of the user, moving time to the destination and generates a response message. It is possible to obtain the present location of the user from the location information DB 223, and it is possible to obtain the movement means of the user from the state information DB 222.

In addition, an algorithm for generating a response message is not particularly limitative, but for example, the message generation section 204 may generate the response message with a combination of a template generated in advance for a response message and the calculated moving time, and so on (for example, "I will be there in about XX (moving time)" and "I am approaching YY (nearest station), so I will be there in about XX (moving time)"). Alternatively, the message generation section 204 may generate a message template typical of the user by machine learning on the basis of the history of messages generated by the user, and use the template for message generation.

In addition, the control section 20 may transmit the generated response message to the message server 4 and provide an instruction to transmit the generated response message to the partner user, or may provide an instruction to cause the generated response message to be transmitted to the user terminal 1 and then to be transmitted to the partner user from the user terminal 1 via the message server 4.

Here, a specific example of an automatic response message is described with reference to FIG. 5. FIG. 5 is a diagram that illustrates an example of an automatic response message according to the first working example.

As illustrated in a message screen 30 in FIG. 5, for example, in response to a question message 301 regarding the present or future movement such as "Where are you now?" from a partner user, the message generation section 204 generates, in accordance with the present location, the state, etc. of a user, a response message 302 such as "I am almost at the station, so I think I will arrive in about 15 minutes" and transmits the response message 302. Here, the message generation section 204 estimates the destination to be the location of the partner user, and calculates moving time by performing route search from the present location of the user to the location of the partner user. The location of the partner user may be obtained from the user terminal 1 of the partner user, or may be estimated from an attribute of the partner user and the schedule information of the user.

It is to be noted that the message screen may explicitly display to the user and the partner user or may explicitly display only to the user that the message is an automatic response by the message generation section 204. In a case of displaying explicitly, for example, a display mode of the response message may be changed (change in text color, font, text background color, and so on), or an agent icon or a bot icon may be displayed.

The response message is not limited to the foregoing example. For example, in a case where the user is in the middle of driving, a response message including a state of the user in addition to the moving time such as "I'm driving right now. I will arrive in about 15 minutes" may be generated.

In contrast, in a case where it is not difficult for the user to reply to the message, or in a case where automatic response is not approved (Step S124/No), the message generation section 204 generates a candidate for the response message, and provides an instruction to display the candidate in the display section 14 in the user terminal 1 (Step S130).

Then, the message generation section 204 provides an instruction to transmit a response message selected by the user to the partner user (Step S133).

Here, a specific example of a candidate for an automatic response message is described with reference to FIG. 6. FIG. 6 is a diagram that illustrates an example of an automatic response message according to the first working example.

As illustrated in a message screen 31 in an upper row in FIG. 6, for example, in response to a question message 311 regarding the present or future movement such as "Aren't you coming home yet?" from a partner user, the message generation section 204 generates and presents a response message candidate 312 such as "In one hour", "In two hours", and "Not yet decided". A user selects an appropriate response from the response message candidate 312. The content of the response message candidate 312 may be preset, or may be generated by machine learning on the basis of a response message history of the user.

Thereafter, for example, in a case where the user selects "In two hours", as illustrated in a message screen 32 in a lower row in FIG. 6, a response message 321 ("I will leave in about two hours") that is generated on the basis of the option is transmitted to the partner user.

It is to be noted that, also in a case where the content regarding the destination is included in the automatic response message generated in Steps S127, S133, etc. illustrated in FIG. 4 (Step S112/Yes), the movement information extraction section 202 extracts, from the message, information regarding future movement (specifically, a destination, and a date and time), and registers the information in the movement schedule DB 225 as a movement schedule (Step S115). For example, as illustrated in FIG. 6, in a case where a message such as "I will leave in about two hours" is transmitted, the movement information extraction section 202 extracts movement schedule information such as "start moving to go home in two hours" (destination: home, scheduled movement start time: two hours from now (for example, 9 PM if it is 7 PM now) and registers the movement schedule information in the movement schedule DB 225 as a movement schedule. It is to be noted that, here, for example, the attribute of the partner user is "spouse", and a message such as "I will leave" means "going home". Therefore, it is estimated that the destination is the user's "home".

Operation processing that performs automatic response in accordance with a user's situation has been specifically described above. In the example illustrated in FIG. 4, registering the movement schedule information (destination, and date and time) in a case where the message includes content regarding the destination (Step S112/Yes) has been described as an example. However, the present working example is not limited to this, and for example, even if the destination is unknown, the scheduled movement start time may be registered in the movement schedule DB 225 as movement schedule information.

3-2. Second Working Example

A second working example is subsequently described. In the present working example, on the basis of the movement schedule information registered in the movement schedule DB 225 (refer to the above Step S115), it is possible to display an alert at appropriate time, and perform automatic transmission of a message in a case of a change in the movement schedule. In the following, a specific description is given with reference to FIGS. 7 and 8.

FIG. 7 is a flowchart that illustrates operation processing based on movement schedule information according to the second working example. As illustrated in FIG. 7, first, the control section 20 in the processing server 2 obtains location information of a user (Step S153). Specifically, for example, the control section 20 obtains the present location of the user from the location information DB 223 in which location information measured by the positioning section that is an example of the sensor 17 in the user terminal 1 is continuously transmitted to be accumulated.

Next, the control section 20 determines whether or not the movement schedule of the user is registered in the movement schedule DB 225 (Step S156).

Subsequently, in a case where the movement schedule of the user is registered in the movement schedule DB 225 (Step S156/Yes), the control section 20 determines whether or not the user is in a situation to be in time for the schedule (Step S159). Specifically, for example, the control section 20 performs route search on the basis of the destination included in the movement schedule information and the present location of the user, calculates moving time to the destination, and calculates movement start time that allows the user to be in time (with time to spare) for the scheduled arrival time included in the movement schedule information (for example, the user may set a threshold for arriving five minutes ahead of time). Thereafter, in a case where the calculated movement start time is approaching (for example, within five minutes. The user may set a threshold), the control section 20 determines that the user is not in a situation to be in time. It is to be noted that, here, whether or not the user is in a situation to be in time for the "scheduled arrival time" is determined by calculating the moving time, but the present embodiment is not limited to this. Whether or not the user has started moving may be determined when the "scheduled movement start time" included in the movement schedule information is approaching.

Thereafter, in a case of determining that the user is not in a situation to be in time (Step S159/No), the message generation section 204 generates an alert message and an option, and provides an instruction to display the alert message and the option in the user terminal 1 (Step S162). The "option" is to specify to what degree the arrival time or the movement start time is to be extended. The message generation section 204 transmits the generated alert message and option from the communication section 21 to the user terminal 1.

Next, the message generation section 204 generates, on the basis of the selected option, a response message (notifying an extension of arrival time or movement start time), and provides an instruction to transmit the response message to the partner user (Step S165). Here, a specific example of an alert and an extension message is described with reference to FIG. 8. FIG. 8 is a diagram that illustrates an example of an alert and an extension message according to the second working example.

As illustrated in a message screen 33 in an upper row in FIG. 8, for example, in exchanging e-mail s with a spouse, in a case where a message such as "I will leave in about two hours" is transmitted at 7 PM, movement schedule information such as "destination: home, scheduled movement start time: 9 PM" is registered in the movement schedule DB 225. In a case where there is five minutes left before 9 PM but the user has not started moving yet, the message generation section 204 generates and presents an alert message 331 (such as "If you do not leave in five minutes, you will not be in time. Do you want extension?"). The alert message 331 may be presented along with an option for time extension. The user may tap "1 Hour+" once in a case of extension for one hour, and may tap "1 Hour+" twice in a case of intending to extend for two hours. In addition, in a case of starting moving immediately without extension, the user selects "No".

Thereafter, as illustrated in a message screen 34 in a lower row in FIG. 8, the message generation section 204 generates, on the basis of the selected option, a message 341 that notifies the partner user of the extension, and transmits the message 341 to the partner user. At this time, the message generation section 204 may calculate scheduled arrival time in consideration of the moving time calculated from the present location and the destination of the user, and generate a message that notifies the partner user of the scheduled arrival time. For example, in a case where the scheduled movement start time is extended for one hour and, further, it takes one hour to go home as moving time, it is possible to calculate, as of 9 PM, that the user will arrive home at 11 PM. In this case, for example, it is possible for the message generation section 204 to generate a message such as "Since it's taking long, I will try to come home by 11 PM" or "I will leave an hour late. I will come home by 11 PM". In addition, the message generation section 204 causes the movement information extraction section 202 to extract movement schedule information from such a message, to register the extracted movement schedule information in the movement schedule DB 225 as a movement schedule, thus making it possible to provide an alert to the user again on the basis of the extended time.

As described above, according to the present working example, it is possible to register movement schedule information on the basis of a message transmitted or received by a user (including a message generated by the user and an automatic response message), and provide an alert to the user in consideration of moving time, and so on when movement start time is approaching. In addition, in the present working example, it is also possible to automatically generate and transmit a message that notifies a partner of an extension of a movement schedule.

3-3. Third Working Example

Next, a third example is described. In the present example, it is possible to appropriately provide a correction proposal in accordance with content regarding movement that is included in a message generated by a user. More specifically, when a user tries to transmit a message including content regarding movement to a certain destination, in a case where a place where the user is actually present and a place where a partner user considers the user is present are different, there is a case where an error occurs in moving time (and furthermore, in arrival time). Therefore, it is possible to avoid transmitting an inconsistent message by providing an alert or a correction proposal.

For example, the place where the user is assumed to be present is determined on the basis of schedule information open to the partner user (such as schedule information shared by a family), content of message exchange with the partner user, a habit of the user, etc. For example, in a case where the user transmits, to the partner user, a message such as "I will work overtime today" or "I'm still at work", it is determined that the partner user assumes that the user is still in the office. In addition, in a case where the user habitually transmits a message such as "I am leaving soon" when leaving the office, it is determined that the partner user, when receiving the message, assumes that the user has just left the office.

In the following, the present working example is specifically described with reference to FIGS. 9 and 10.

FIG. 9 is a flowchart that illustrates operation processing of an alert and a correction proposal according to the third working example. Referring to the flowchart, a case in which a place where the user is assumed to be present is determined on the basis of a habit of the user (an expression of a message that is frequently transmitted) is described.

As illustrated in FIG. 9, first, the control section 20 in the processing server 2 causes the message analysis section 201 to analyze a message scheduled to be transmitted by the user (Step S203). The message scheduled to be transmitted is a message that the user intends to transmit to the partner user. For example, when the user taps a transmission button in trying to transmit a generated message, transmission of the message to the partner user is temporarily suspended, and the message intended to be transmitted is analyzed in the processing server 2.

Next, the control section 20 determines, with reference to the message-associated movement history DB 224, whether or not the message scheduled to be transmitted includes an expression frequently used by the user regarding movement (for example, a character string indicating that the user has just started moving or is in the middle of moving) (Step S206). As described above, in the message-associated movement history DB 224, a message transmitted by the user regarding movement and movement information (such as a start point, a destination, and a date and time) corresponding to the message are stored in association with each other. It is therefore possible for the control section 20 to determine an expression frequently used by the user regarding movement (it is possible to appropriately set a threshold for determining whether or not the expression is frequently used).

Thereafter, in a case where the message scheduled to be transmitted includes an expression frequently used regarding movement (Step S206/Yes), the control section 20 determines, with reference to a movement history corresponding to the expression, whether or not moving time from a corresponding predetermined start point to a corresponding predetermined destination and moving time from the present location of the user to the predetermined destination are different from each other (Step S209). For example, the corresponding predetermined start point and the corresponding predetermined destination are extracted from the movement history, and more specifically, for example, it is possible for the control section 20 to extract "start point: office, destination: home" from a movement history associated with the expression "I am leaving soon". In this case, the control section 20 calculates each of the moving time to be spent on going home from the office and the moving time to be spent on going home from the present location of the user, and determines whether or not the two are different from each other.

Next, in a case where the two moving times are different from each other (Step S209/Yes), there is a possibility of occurrence of an error in arrival time. Therefore, the message generation section 204 generates an alert message and an option, and provides an instruction to display the alert message and the option in the display section 14 in the user terminal 1 (Step S212). The option includes a plurality of proposals regarding transmission of a message. Here, FIG. 10 illustrates an example of a display screen for an alert message and an option according to the present working example.

As illustrated in a message screen 35 in FIG. 10, when the user tries, in response to a message such as "Aren't you coming home yet?" from the partner user (spouse), to transmit a response message 351 such as "I am leaving soon", the present system displays an alert display 352. Specifically, in a case where such an expression as "I am leaving soon" is habitually used when the user leaves the office for home, the partner user (spouse) assumes that the user is in the office. However, when the user is actually at a drinking party and present at a place different from the office, it is likely that the moving time to the user's home is different from usual.

Therefore, the message generation section 204 compares moving time from the place where the user is assumed to be present and moving time from the present location, and generates and presents an alert message such as "Even if you leave now, you will get home later than usual". In addition, along with the alert message, the message generation section 204 proposes an option such as "Do you want to send the above message at appropriate timing? YES/Correct/Transmit as it is".

Thereafter, in a case where the user selects transmission at appropriate timing (in a case where the user selects "YES" from the above) (Step S215/Appropriate timing), when the moving time to the predetermined destination matches the moving time from the present location of the user (Step S218/Yes), the control section 20 provides an instruction to transmit, to the partner user, the message intended to be transmitted by the user (Step S221). In other words, for example, it is possible to transmit the message "I am leaving soon" to the partner user at appropriate timing when the moving time to be spent on going home from the present location of the user matches the moving time to be spent on going home from a place where the user is assumed to be present (here, "office"). It is thereby possible to solve the inconsistency in homecoming time.

In contrast, in a case where the user selects "Transmit as it is" (Step S215/Transmitting as it is), the control section 20 provides an instruction to transmit, to the partner user, the message intended to be transmitted by the user (Step S221). In this case, as described above, an inconsistency occurs in homecoming time, but the message is transmitted as it is by giving priority to the selection by the user.

Alternatively, in a case where the user selects "Correct" (Step S215/Correct), the control section 20 receives a message correction by the user (Step S224), and provides an instruction to transmit the corrected message to the partner user (Step S221).

As described above, according to the present working example, in a case where there is a possibility of occurrence of an inconsistency in moving time when the user transmits a message regarding movement at a place different from the place assumed by the partner user, it is possible to provide an alert, a correction proposal, etc. or perform transmission control at appropriate timing.

It is to be noted that, in the example illustrated in FIG. 10, an option is presented along with an alert message, but the present working example is not limited to this. For example, in a case where no instruction is provided by the user for a predetermined time after the alert message is displayed, the control section 20 may cause the message inputted by the user to be transmitted as it is without change. In addition, in a case where an instruction is provided by the user within a predetermined time after the alert message is displayed, the control section 20 may appropriately replace the message and performs transmission in accordance with the instruction by the user, or may shift to a re-input screen for the user. In replacing the message, for example, "I am leaving soon" may be changed to a message that solves the inconsistency in arrival time, such as "I will leave in 30 minutes" or "I left ten minutes ago", in consideration of an error between the moving time from the present location and the moving time from a predetermined start point.

3-4. Fourth Working Example

Thereafter, a fourth working example is described. In the present example, it is possible to obtain location information of a plurality of users performing message exchange, determine whether or not it is possible to be in time for appointment time in consideration of moving time of each user to a destination, and provide an alert and a proposal appropriately in a case where there is a user that will not be in time. In the following, a specific description is given with reference to FIGS. 11 to 14.

(Registration Processing of Movement Schedule)

FIG. 11 is a flowchart that illustrates registration processing of a movement schedule on the basis of a message according to the fourth working example. As illustrated in FIG. 4, first, the control section 20 in the processing server 2 causes the message analysis section 201 to analyze a message transmitted or received by a user (Step S303), and determines whether or not the transmitted or received message includes content regarding movement (Step S306). For example, the content regarding movement is content that indicates when and where to move, and includes a destination, a date and time, and furthermore, a movement means, and so on. Here, FIG. 12 illustrates an example of message exchange according to the present working example.

As illustrated in a message screen 36 in FIG. 12, for example, in a case of responding to a message 361 such as "I feel like eating out today. How about that usual Italian restaurant?? We haven't been there for a while" by transmitting a message 362 such as "OK! I will reserve a table at 7 PM", the message analysis section 201 analyzes these messages, and the movement information extraction section 202 extracts content regarding movement. Specifically, for example, movement schedule information such as "destination: usual Italian restaurant, date: 7:00 PM today" is extracted. It is to be noted that, in a case where the destination is not clear such as "usual Italian restaurant", it is possible for the control section 20 to cause the destination estimation section 203 to identify the restaurant, with reference to the message DB 221, through data mining from the history of the message transmitted and received by the user (Furthermore, the restaurant may be identified from the user's habit by performing behavior recognition on the basis of information accumulated in the state information DB 222, the location information DB 223, etc.) This makes it possible to obtain a location (location information) of the Italian restaurant usually visited by the user and the partner user. In addition, the movement schedule information may include information regarding the reserved restaurant, which is obtained from a message, a network, etc. (a Website URL, telephone number, location information, and so on of the restaurant).

Next, the control section 20 determines whether or not the above content regarding movement includes arrival time at the destination (Step S309).

In a case where the arrival time at the destination is not included (Step S309/No), the control section 20 asks the user about the arrival time (Step S312).

Further, in a case where the arrival time at the destination is included (Step S309/Yes), or when the arrival time is obtained through inquiry to the user, the control section 20 registers, in the movement schedule DB 225, a destination, arrival time, restaurant information, a participating member (a partner user performing message exchange regarding the movement), and so on as movement schedule information (Step S315).

(Notification Processing of Movement Schedule)

Next, notification based on the registered movement schedule information is described with reference to FIG. 13. FIG. 13 is a flowchart that illustrates notification processing of a movement schedule according to the fourth working example.

As illustrated in FIG. 13, first, the control section 20 in the processing server 2 obtains location information of a specific user (Step S323).

Next, with reference to the movement schedule DB 225, the control section 20 confirms whether or not a movement schedule of the user is registered (Step S326).

Thereafter, in a case where the movement schedule of the user is registered (Step S326/Yes), with reference to the present location and the registered movement schedule information of the user, the control section 20 determines whether or not the user will be in time for the arrival time (Step S329). More specifically, with reference to the destination and the arrival time that are included in the movement schedule information, the control section 20 calculates moving time from the present location of the user to the destination, to determine whether or not the user will be in time for the arrival time.

Next, in a case of determining that the user will not be in time from the present location (Step S329/No), the message generation section 204 generates an alert message and provides an instruction to display the alert message in the user terminal 1 (Step S331). The message generation section 204 also generates a message notifying lateness for the schedule and provides an instruction to transmit the message to the partner user (Step S332).

In contrast, in a case of determining that the user will be in time from the present location (Step S329/Yes), the control section 20 identifies another participant from the movement schedule information, and in a case of being able to obtain the location information of the other participant, the control section 20 determines whether or not the other participant will be in time (Step S335).

Thereafter, in a case where the other participant or the user will not be in time, the control section 20 generates a message that proposes a reservation change, and provides an instruction to display the message in the user terminal 1 of each participant (Step S338). Here, FIG. 14 illustrates an example of a display of a proposal to change reservation time. As illustrated in a message screen 37 in FIG. 14, for example, in a case where the user is not in time for scheduled arrival time that is registered, the message generation section 204 generates a message 371 such as "I am running late" and transmits the message 371 to the partner user (in other words, the other participant), while displaying a display 372 that includes an alert message and a proposal to change reservation time in the display section 14 in the user terminal 1. It is possible to present such a proposal for change not only to the user but also to the partner user (the other participant).

In a case of having a reservation at a restaurant, for example, the proposal for change includes changing reservation time. At this time, the processing server 2 may provide a proposal to change the reservation time to the user after confirming available time for change through a reservation site, and so on. In addition, since it is assumed that there is a case where the user or the other participant directly calls the restaurant to change the reservation or to confirm whether it is possible to change the reservation, an option such as "Call restaurant" may be presented. In a case where "Call restaurant" is selected, the user terminal 1 activates a telephone function and automatically originates a call to the restaurant. It is possible that reservation information includes a telephone number of the restaurant. In addition, since a case of not changing is also assumed, an option such as "Not change" may also be presented.

Subsequently, in a case where time for reservation change is selected, it is determined whether or not the selected reservation change is possible (Step S341). For example, the processing server 2 makes an inquiry to the restaurant, through a reservation site and so on, about whether or not the selected change in reservation time is possible.

Next, in a case where the reservation change is possible (Step S341/Yes), a message notifying that the reservation has been changed is generated, and an instruction to display the message in the user terminal 1 of each participant is provided (Step S344).

In contrast, in a case of being unable to change the reservation (Step S341/No), a message notifying that it is not possible to make a reservation is generated, and an instruction to display the message in the user terminal 1 of each participant is provided (Step S347).

As described above, according to the present working example, on the basis of the present location information of a plurality of users, it is possible to determine whether or not each user will be in time for arrival time, with reference to schedule information registered on the basis of messages exchanged between users. It is possible, in a case where there is a user that will not be in time, it is possible to automatically generate a message to notify every user that the user will not be in time. In addition, it is also possible to provide a proposal to each user regarding a schedule, such as change in reservation time.

It is to be noted that, in the foregoing example, change in reservation time is proposed since there is a reservation at a restaurant. However, in a case of simply having an appointment, for example, "change in appointment time" may be proposed.

4. SUMMARY

As described above, an information processing system according to an embodiment of the present disclosure makes it possible to provide an appropriate proposal to a user on the basis of a message regarding movement.

Although some preferred embodiments of the present disclosure have been described in detail above with reference to the attached drawings, the present technology is not limited to such examples. It is clear that those having ordinary knowledge in the art in the technical field of the present disclosure will easily arrive at various alterations or modifications within a scope of the technical idea described in the claims, and it is understood that these alternations or modifications naturally belong to the technical scope of the present disclosure.

For example, it is also possible to create a computer program intended to cause hardware such as a CPU, a ROM, or a RAM, which is incorporated in the above described user terminal 1 or processing server 2 to execute a function of the user terminal 1 or the processing server 2. In addition, there is also provided a computer-readable storage medium in which the computer program is stored.

In addition, the effects described herein are merely descriptive or illustrative and are not limitative. In other words, in addition to or in place of the effects described above, the technology according to the present disclosure can have other effects clear to those skilled in the art from the description herein.

It is to be noted that the present technology may have the following configurations.

(1)

An information processing apparatus, including a control section, the control section extracting information regarding movement from a message, the control section calculating, on the basis of a present location of a user, moving time to be spent on immediate movement of the user, and the control section generating proposal information regarding the movement in accordance with whether or not the calculated moving time satisfies a predetermined condition.

(2)

The information processing apparatus according to (1) described above, in which in a case where a message created by the user includes a keyword related to movement, the control section determines, as the predetermined condition, whether or not the calculated moving time matches moving time from a place where the user is assumed to be present, and in a case where the calculated moving time is different from the moving time from the place where the user is assumed to be present, the control section generates an alert message for the user.

(3)

The information processing apparatus according to (2) described above, in which the keyword related to the movement includes a character string, the character string indicating that the user starts moving or is in a middle of moving.

(4)

The information processing apparatus according to (2) or (3) described above, in which the control section provides a proposal for correction of the message created by the user or transmission, at appropriate timing, of the message created by the user, the proposal being provided along with the alert message.

(5)

The information processing apparatus according to (4) described above, in which, in a case where the user selects the transmission at the appropriate timing, the control section performs control to transmit the message, created by the user, at timing that allows moving time from the present location of the user and the moving time from the place where the user is assumed to be present to match each other.

(6)

The information processing apparatus according to any one of (2) to (5) described above, in which the moving time to be spent on the immediate movement includes moving time to a destination included in a movement history of the user, the movement history being associated with a message that have been transmitted in past and matches the message created by the user.

(7)

The information processing apparatus according to any one of (2) to (6) described above, in which the place where the user is assumed to be present is a start point in a movement history of the user, the movement history being associated with a message that have been transmitted in past and matches the message created by the user.

(8)

The information processing apparatus according to any one of (2) to (6) described above, in which the place where the user is assumed to be present is determined from schedule information, the schedule information being shared with a partner user with whom the user performs message exchange.

(9)

The information processing apparatus according to (1) described above, in which the control section extracts information regarding future movement from the message exchanged between a plurality of users, to register the information in a storage section as movement schedule information, the control section determines, on the basis of a destination and scheduled arrival time as the predetermined condition, whether or not the user will be able to arrive at the destination by the scheduled arrival time, taking into consideration the moving time from the present location of the user, the destination and the scheduled arrival time being included in immediate movement schedule information included in the registered movement schedule information, and in a case of determining that the user will not be able to arrive at the destination by the scheduled arrival time, the control section generates an alert message for the user.

(10)

The information processing apparatus according to (9) described above, in which, in a case of determining that the user will not be able to arrive at the destination by the scheduled arrival time, the control section further generates a message and performs control to transmit the message, the message notifying a partner user that the user will be late for the scheduled arrival time.

(11)

The information processing apparatus according to (9) or (10) described above, in which, in a case of determining that the user will not be able to arrive at the destination by the scheduled arrival time, the control section further proposes a change in scheduled time to a partner user and the user.

(12)

The information processing apparatus according to (11) described above, in which the control section proposes, as the change in the scheduled time, changing reservation time at a shop, and in a case where the changing the reservation time is selected, the control section requests the shop to change the reservation time, on the basis of shop information included in the movement schedule information.

(13)

The information processing apparatus according to (12) described above, in which, in a case where the changing the reservation time is possible, the control section generates a message and performs control to present the message to the user and the partner user, the message notifying a change in the reservation time.

(14)

The information processing apparatus according to (1) described above, in which, in response to a message from a partner user regarding present or future movement, the control section generates a message based on the calculated moving time, and performs control to transmit, in place of the user, the message to the partner user, the control section generating the message in accordance with a user state.

(15)

The information processing apparatus according to (14) described above, in which the control section estimates a destination and calculates moving time to the estimated destination, the destination being estimated on the basis of a present location of the partner user, an attribute of the partner user, a message history, or schedule information of the user.

(16)

The information processing apparatus according to (9) described above, in which, in a case of determining that the user will not be able to arrive at the destination by the scheduled arrival time, the control section further presents an option for extension time as a candidate for a reply, generates a message on the basis of selected extension time, and performs control to transmit the message, the message notifying a partner user that the user will be late for the scheduled arrival time.

(17)

An information processing method, including:

causing a processor to extract information regarding movement from a message;

causing the processor to calculate, on the basis of a present location of a user, moving time to be spent on immediate movement of the user; and causing the processor to generate proposal information regarding the movement in accordance with whether or not the calculated moving time satisfies a predetermined condition.

(18)

A program directed to causing a computer to function as a control section, the control section extracting information regarding movement from a message, the control section calculating, on the basis of a present location of a user, moving time to be spent on immediate movement of the user, and the control section generating proposal information regarding the movement in accordance with whether or not the calculated moving time satisfies a predetermined condition.

DESCRIPTION OF REFERENCE SIGNS 1 (1A, 1B) User terminal
10 Control section
101 State estimation section
11 Communication section
12 Operation input section
13 Audio input section
14 Display section
15 Audio output section
16 Storage section
17 Sensor
2 Processing server
20 Control section
201 Message analysis section
202 Movement information extraction section
203 Destination estimation section
204 Message generation section
21 Communication section
22 Storage section
221 Message DB
222 State information DB
223 Location information DB
224 Message-associated movement history DB
225 Movement schedule DB
3 Network
4 Message server

The invention claimed is:

1. An information processing apparatus, comprising:
a control section configured to:
extract a keyword from a first message associated with movement of a first user, wherein the first message is sent by a second user;
calculate, based on a present location of the first user, a first moving time to be spent on the movement of the first user, wherein
the extracted keyword from the first message includes a destination, and
the destination is associated with the movement of the first user from the present location to the destination;
determine an automatic response based on a present state of the first user in a case where it is difficult for the first user to reply to the first message; and
generate, based on the determined automatic response and the calculated first moving time that satisfies a specific condition, a second message which is a response to the first message, wherein the specific condition corresponds to a condition in which the calculated first moving time is different from a second moving time,
the second moving time corresponds to a movement time of the first user from a place where the first user is assumed to be present to the destination, and
the second message includes the calculated first moving time of the first user.

2. The information processing apparatus according to claim 1, wherein
the determination that the calculated first moving time is different from the second moving time is based on the second message that includes the keyword associated with the movement of the first user,
the second moving time is from the place where the first user is assumed to be present, and
the control section is further configured to generate an alert message for the first user based on the determination that the calculated first moving time is different from the second moving time.

3. The information processing apparatus according to claim 2, wherein
the keyword comprises a character string,
the keyword is associated with the movement, and
the character string indicates one of a start of the movement of the first user or the first user is in a middle of the movement.

4. The information processing apparatus according to claim 2, wherein
the control section is further configured to provide proposal for one of a correction of the second message or a transmission, at an appropriate timing, of the second message,
the correction of the second message and the second message are created by the first user, and
the proposal is provided along with the alert message.

5. The information processing apparatus according to claim 4, wherein
the control section is further configured to control, based on a selection of the transmission of the second message at the appropriate timing by the first user, the transmission of the second message at a timing that allows the first moving time from the present location of the first user to the destination of the first user to match with the second moving time from the place where the first user is assumed to be present to the destination of the first user.

6. The information processing apparatus according to claim 2, wherein
the first moving time to be spent on the movement comprises a moving time to a destination location,
the destination location is included in a movement history of the first user, and
the movement history is associated with the first message that was transmitted in past and matches the second message.

7. The information processing apparatus according to claim 2, wherein
the place where the first user is assumed to be present is a start point in a movement history of the first user, and
the movement history is associated with the first message that was transmitted in past and matches the second message.

8. The information processing apparatus according to claim 2, wherein the place where the first user is assumed to be present is determined from schedule information, and the schedule information is shared with the second user with whom the first user exchanges the second message.

9. The information processing apparatus according to claim 1, wherein the control section is further configured to:

extract information associated with future movement from the first message exchanged between a plurality of users, to register the information associated with the future movement in a storage section as movement schedule information;

determine, based on a destination location and a scheduled arrival time as the specific condition, whether the first user will be able to arrive at the destination location by the scheduled arrival time, taking into consideration the first moving time from the present location of the first user, the destination location, and the scheduled arrival time are included in the registered movement schedule information; and generate, based on the determination that the first user will not be able to arrive at the destination location by the scheduled arrival time, an alert message for the first user.

10. The information processing apparatus according to claim 9, wherein the control section is further configured to:

determine the second message based on the determination that the first user will not be able to arrive at the destination location by the scheduled arrival time; and transmit the second message, and the second message notifies the second user that the first user will be late for the scheduled arrival time.

11. The information processing apparatus according to claim 9, wherein, based on the determination that the first user will not be able to arrive at the destination location by the scheduled arrival time, the control section is further configured to propose a change in a scheduled time to the second user and the first user.

12. The information processing apparatus according to claim 11, wherein the change in the scheduled time corresponds to a change in a reservation time at a shop, the control section is further configured to request, based on shop information and a selection of the change in the reservation time, the shop to change the reservation time, and the shop information is included in the movement schedule information.

13. The information processing apparatus according to claim 12, wherein the control section is further configured to:

determine the second message to notify the change in the reservation time; and notify the second message to the first user and the second user.

14. The information processing apparatus according to claim 9, wherein, based on the determination that the first user will not be able to arrive at the destination location by the scheduled arrival time, the control section is further configured to:

present an option for an extension time as a candidate for a reply;

determine the second message based on the extension time; and transmit the second message to notify the second user that the first user will be late for the scheduled arrival time.

15. The information processing apparatus according to claim 1, wherein, in response to the first message from the second user associated with at least one of present movement or future movement, the control section is further configured to:

determine the second message based on the calculated first moving time; and transmit the second message to the second user.

16. The information processing apparatus according to claim 15, wherein the control section is further configured to:

estimate a destination location of the first user; and calculate the second moving time to the estimated destination location, and the destination location is estimated based on at least one of a present location of the second user, an attribute of the second user, a message history, or schedule information of the first user.

17. An information processing method, comprising:

extracting a keyword from a first message associated with movement of a first user, wherein the first message is sent by a second user;

calculating, based on a present location of the first user, a first moving time to be spent on the movement of the first user, wherein the extracted keyword from the first message includes a destination, and the destination is associated with the movement of the first user from the present location to the destination;

determining an automatic response based on a present state of the first user; and generating, based on the determined automatic response and the calculated first moving time that satisfies a specific condition, a second message which is a response to the first message, wherein the specific condition corresponds to a condition in which the calculated first moving time is different from a second moving time, the second moving time corresponds to a movement time of the first user from a place where the first user is assumed to be present to the destination, and the second message includes the calculated first moving time of the first user.

18. A non-transitory computer-readable medium having stored thereon, computer executable-instructions that, when executed by a processor, cause the processor to execute operations, the operations comprising:

extracting a keyword from a first message associated with movement of a first user, wherein the first message is sent by a second user;

calculating, based on a present location of the first user, a first moving time to be spent on the movement of the first user, wherein the extracted keyword from the first message includes a destination, and the destination is associated with the movement of the first user from the present location to the destination;

determining an automatic response based on a present state of the first user in a case where it is difficult for the first user to reply the first message; and generating, based on the determined automatic response and the calculated first moving time that satisfies a specific condition, a second message which is a response to the first message, wherein the specific condition corresponds to a condition in which the calculated first moving time is different from a second moving time, the second moving time corresponds to a movement time of the first user from a place where the first user is assumed to be present to the destination, and the second message includes the calculated first moving time of the first user.

\* \* \* \* \*